Aug. 9, 1932.  J. REID  1,871,201
LUBRICATING SYSTEM
Filed Nov. 22, 1928   2 Sheets-Sheet 2

Inventor
John Reid
Knight Bro
By
Attorneys

Patented Aug. 9, 1932

1,871,201

UNITED STATES PATENT OFFICE

JOHN REID, OF OIL CITY, PENNSYLVANIA

LUBRICATING SYSTEM

Application filed November 22, 1928. Serial No. 321,234.

This invention relates to a lubricating system and has for its object to provide a system which will supply a definite quantity of oil to the bearing surfaces regardless of changes in temperature affecting its fluidity. This result is accomplished by maintaining a supply of oil under the influence of a yielding pressure device and alternately opening and closing the oil conduit leading to the bearing surfaces, so that each time the conduit is opened a definite quantity of oil is squirted through.

While my invention is of general application, it will be described in the following as applied to a gear or band wheel power.

In known powers the lubricating oil is collected in a sump located at the base of the apparatus, pumped to the top of the power, led under the force of gravity to the bearing surfaces, and conducted back to the sump. There is the disadvantage present in the known powers that the quantity of oil fed by gravity to the bearing surfaces will vary considerably with changes in temperature.

By the use of my system the amount of oil supplied to the bearing surfaces is largely independent of temperature, because of the great increase in the force which causes the oil to flow.

The opening and closing of the oil conduit is preferably accomplished by running the conduit through a shoe and race, one of which is fixed with relation to one of the bearing surfaces and the other of which is fixed with relation to the other bearing surface. Each time the portions of the conduit in the shoe and race come to register a quantity of oil is squirted through by the yielding pressure device. At other times the flow of oil is stopped by the discontinuity of the conduit.

A preferred embodiment of my invention is shown, by way of example, in the accompanying drawings.

Figure 1:
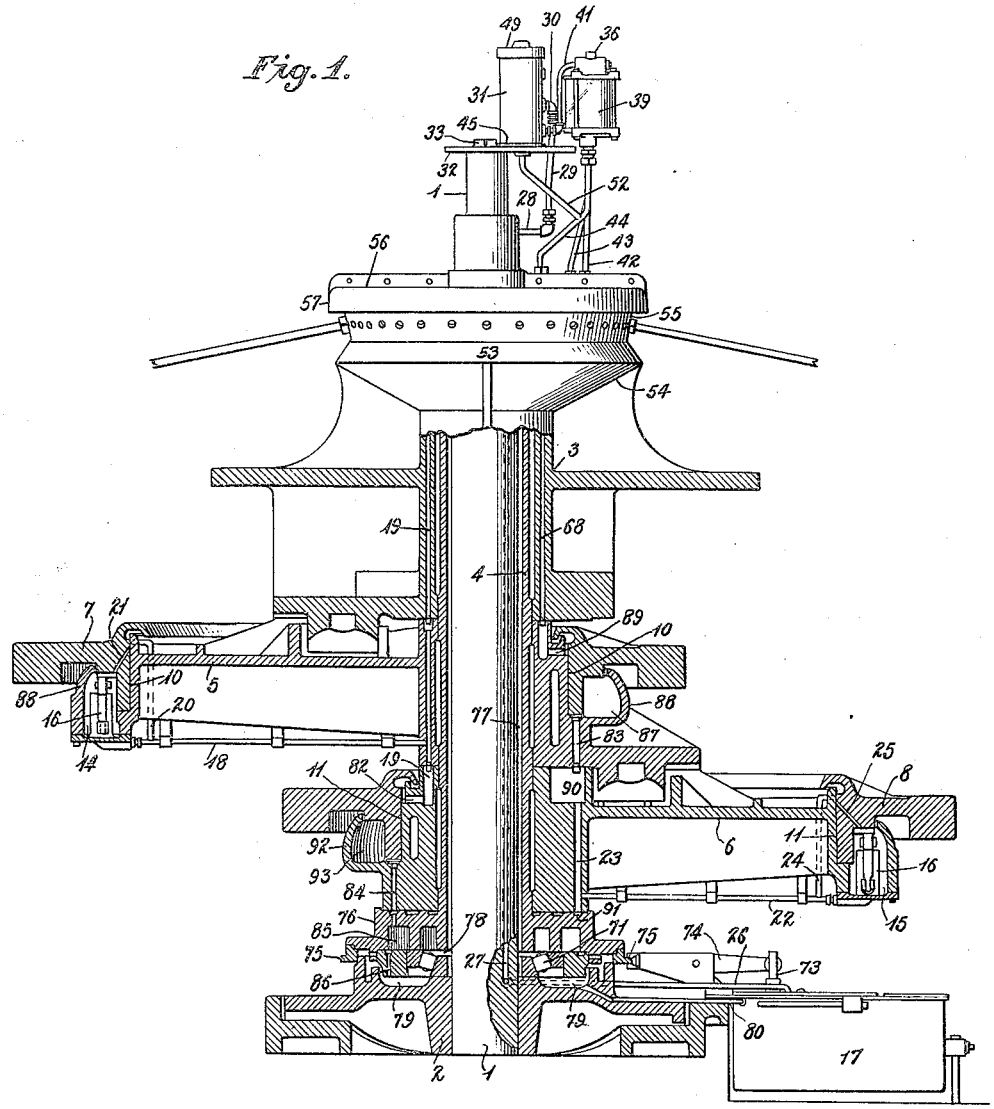
Figure 2:
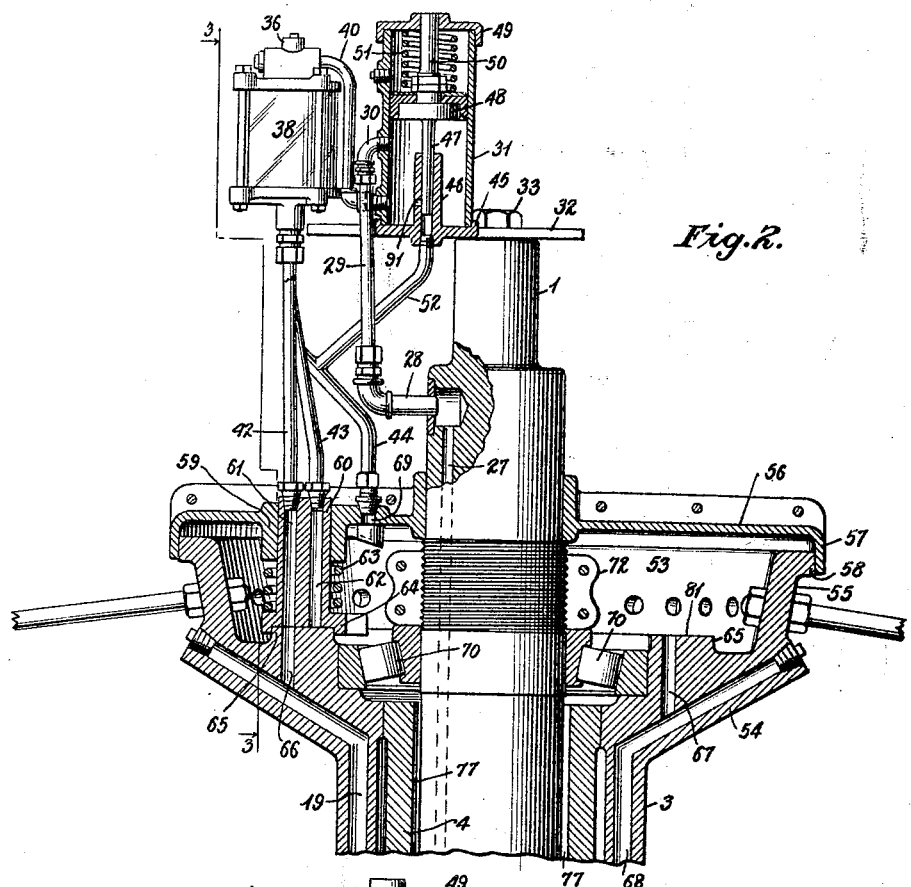
Figure 3:
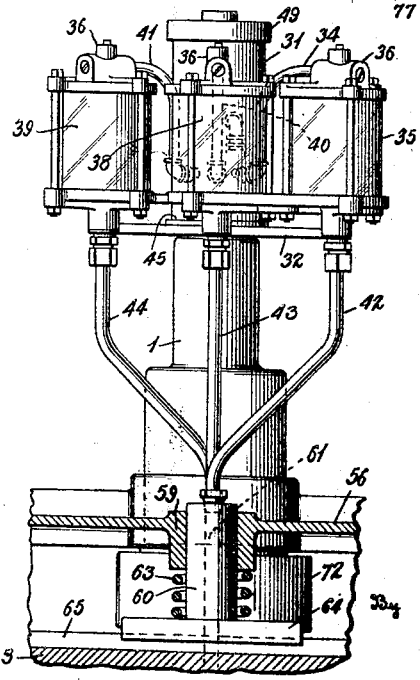

Figure 1 is a view partly in section of a band wheel power equipped with a lubricating system according to my invention, Figure 2 is a rear view, on larger scale and partly in section, of the band wheel power in Fig. 1 and shows only the upper portion thereof, Figure 3 is a left side view of the sight feed and part of the lubricating system shown in Fig. 2 taken along line 3—3.

Coming now to a description of my invention, a vertical shaft 1 is mounted on a base 2. A hub 3 is rotatably mounted on shaft 2 and a sleeve 4 is interposed between said shaft and hub. Eccentrics 5 and 6 are rigidly fastened to hub 3 in any suitable manner and are engaged by eccentric rings 7 and 8 respectively.

Reservoirs 14 and 15 are formed in the eccentrics at the point furthest from the center of rotation to catch the oil thrown out by centrifugal force.

Pumps 16, which may be of a construction similar to that shown and described in my co-pending application Ser. No. 321,236, are placed in the reservoirs 14 and 15 to pump the oil thrown to that point by centrifugal force back to a sump 17. A pipe 18 leads from pump 16 to a conduit 19 formed in hub 3. A later description will explain how the oil is returned to sump 17 from conduit 19. A pipe 20 leads from pipe 18 to a bore 21 in eccentric ring 7 so that a part of the oil pumped into pipe 18 by pump 16 is led through pipe 20 and bore 21, when the latter register, to a point above the pump. As the oil leaves bore 21 it falls on the exposed working parts of the pump and lubricates them. The same arrangement is provided for the other eccentric and ring, pipe 22 leading from pump 16 to conduit 23 and pipe 24 from pipe 22 to bore 25. Conduit 23 also communicates with sump 17 as will be described later.

A pipe 26 is connected to a pump in sump 17 and communicates with a bore 27 in shaft 1. Bore 27 in turn communicates with piping 28, 29 and 30 connected to a cylinder or chamber 31.

Referring now particularly to Fig. 2, cylinder 31 is mounted on a base 32 rigidly secured to shaft 1 by a nut 33. A piping 34 connects cylinder 31 with a sight reservoir 35. A needle valve 36 is placed at the point where pipe 34 empties into the sight reservoir to regulate the flow of oil into the latter.

Two other sight reservoirs 38 and 39 are similarly connected to cylinder 31 by pipings 40 and 41 respectively (see Fig. 3), and also are provided with needle valves 36. Outlet pipes 42, 43 and 44 are connected to reservoirs 35, 38 and 39 respectively.

Cylinder 31 is screwed into an upstanding annular flange 45 integral with base 32. A vertical sleeve 46 on base 32 forms a guide for the stem 47 of a piston 48. A cap 49 is screwed on the top of cylinder 31. A second stem 50 on piston 48 projects through cap 49 and guides the piston from above. A spring 51 is placed between the piston 48 and cap 49 and surrounds stem 50. This spring 51 and piston 48 exert a yieldable pressure on the oil in the cylinder 31 which has been pumped from sump 17.

When the pressure of the oil in the cylinder 31 exceeds a predetermined amount dependent upon the tension of spring 51, the piston 48 will be forced away from sleeve 46 to such an extent that stem 47 will no longer close port 91 in sleeve 46. The oil will now be able to escape through port 91, sleeve 46 and out pipe 52 into pipe 44. The pressure of the oil in cylinder 31 will thereby be decreased below the maximum pressure desirable in the cylinder and stem 47 will again close port 91.

A cup 53 is formed at one end of hub 3 and comprises an outwardly extending portion 54 and upwardly extending portion 55. A cover 56 is provided for cup 53. The cover 56 is secured to shaft 1 and remains stationary therewith. A depending flange 57 on cover 56 surrounds a peripheral flange 58 on cup 53. In this manner the interior of cup 53 is kept free of dust and dirt. A sleeve 59 formed in cover 56 serves as a vertical guide for a shoe 60 having two bores 61 and 62 connected to pipes 42 and 43 respectively. A spring 63 is inserted between sleeve 59 and an abutment 64 on shoe 60. By means of spring 63 shoe 60 is pressed against an annular race 65 arranged on the outwardly extending portion 54 of cup 53.

As may be seen in the drawings, bores or conduits 61 and 62 in shoe 60 are arranged at different distances from the center of rotation of hub 3 and register alternately with bores 66 and 67 in race 65 in each revolution of hub 3. In the operation of the power, cup 53 rotates with hub 3 and cover 56 remains stationary with shaft 1. Pipes 42 and 43 are made of flexible tubing so that compensation is allowed for any wear of shoe 60 or for any vertical movement of shoe 60 caused by an unevenness of race 65.

Bore 66 in race 65 leads into conduit 19 in hub 3 and bore 67 into conduit 68 also in hub 3. Pipe 44 leading from reservoir 39 is connected to a port 69 in cover 56, port 69 being arranged directly over the tapered roller bearing 70 interposed between shaft 1 and portion 54 of hub 3. A similar bearing 71 is interposed between the base 76 of sleeve 4 and shaft 1.

The plunger 73 of a pump, such as described in my Patent No. 1,497,986, is actuated by a rocker arm 74 cooperating with a pump cam 75 arranged circumferentially on the base 76 of sleeve 4.

The course of the lubricating oil through the band wheel power will now be explained. Upon the rotation of hub 3, sleeve 4 and its base 76, the pump, above referred to, in sump 17 forces the oil from the sump 17 to the chamber 31 through pipe 26, bore 27, and piping 28, 29, 30. In the chamber 31 the oil is placed under pressure as described above. The oil leaves chamber 31 under pressure by way of pipes 34, 40 and 41 and enters reservoirs 35, 38 and 39. The supply of oil to each reservoir may be regulated by adjusting the reservoir's needle valve 36, and the bearing surfaces of any particular eccentric and ring not in use may have their supply of oil cut off entirely by means of the corresponding needle valve.

It is assumed for purposes of illustration, that there is relative motion at every bearing surface. Therefore each reservoir will be kept full of oil under pressure.

The oil in reservoir 39 is fed to tapered bearing 70 through pipe 44. From the bearing 70 the oil passes down along shaft 1 in a space 77 formed between sleeve 4 and the shaft 1, through an oil lead 78, past bearing 71 lubricating the latter as it does so, and drops into an annular sump 79 formed in base 2. A conduit 80 leads the oil from sump 79 into sump 17.

The oil in reservoir 35 is led to shoe 60 through pipe 42 and when bore 61 registers with bore 66, the oil spurts through and enters conduit 19. When bores 61 and 66 do not register, the face 81 of race 65 closes effectively the end of bore 61 to prevent any oil from escaping. The spring 63 does its part when it presses shoe 60 against race 65 as it offsets the pressure exerted by the oil in bore 61 on the face 81 of race 65. The oil in conduit 19 passes to an oil lead 82 which supplies the bearing surfaces 11 between eccentric 6 and eccentric ring 8. Part of the oil as it leaves bearing surfaces 11 drops through oil lead 84 into an oil compartment 85 formed in the base 76 of sleeve 4. Oil lead 86 leads the oil from compartment 85 to sump 79. From there it is conducted to sump 17 as described above. The rest of the oil from the bearing surfaces 11 is caught in an annular trough 93 formed by a lip 92 on eccentric 6 as it is thrown out by centrifugal force. As the eccentric whirls around, lip 92 guides the oil to the point which is furthest from the center of rotation. Here it collects in reservoir 15 and is pumped out as described above. The oil which reaches conduit 23 through pipe 22 drops into annular groove 91 and is led off through oil lead 84 to compartment 85 where it joins with the oil coming directly from bearing surfaces 11.

The oil in reservoir 38 is led to shoe 60 through pipe 43 and when bore 62 registers with bore 67, the oil spurts through and enters conduit 68. In this case also the face 81 of race 65 effectively closes the end of bore 62 when the latter is not registering with bore 67. The oil in conduit 68 passes to an oil lead 89 which supplies the bearing surfaces 10 between eccentric 5 and eccentric ring 7. Part of the oil as it leaves the bearing surfaces 10 drops through oil lead 83 into an oil compartment 90 formed in hub 3. Conduit 23 leads the oil from compartment 90 to the annular groove 91. The oil coming from compartment 90 and pipe 22 joins in pipe 23 and together is led back to sump 17, as described above with regard to oil coming from bearing surface 11. A lip 88 on eccentric 5 forms a trough 87 which catches the oil similarly to trough 93. The oil finally reaching reservoir 14 under the action of centrifugal force is pumped out by pump 16. The oil which reaches conduit 19 through pipe 18 drops into oil lead 82 and accompanies the oil coming from reservoir 35 during the rest of its course back to sump 17.

According to my invention, therefore, the oil on the supply side of the race is constantly under the influence of a yielding pressure device which forcibly squirts the oil through at regular intervals as the continuity of the conduits is established. The lubrication under all conditions of temperature of the bearing surfaces is thereby insured.

I wish it to be understood that the description herein contained is only one embodiment of my invention and that various modifications may be made without departing from the scope of my invention as set forth in the appended claim.

Having thus described my invention, what I claim is:—

In a lubricating system of the kind described, the combination of a vertical shaft and a hub mounted on said shaft adapted to have relative motion imparted to them, a cup on said hub, a cover for said cup, said cover being non-rotatably secured to said shaft, an annular race in said cup, a shoe abutting on said race, a vertical guide in said cover for said shoe, yieldable means for pressing said shoe against said race, and a lubricating conduit passing through said shoe and said race, the continuity of said conduit being controlled by the relative motion of said hub and shaft.

The foregoing specification signed at Oil City, Pa., this 7th day of November, 1928.

JOHN REID.